United States Patent
Sheem et al.

(10) Patent No.: US 8,889,299 B2
(45) Date of Patent: Nov. 18, 2014

(54) POSITIVE ACTIVE MATERIAL AND METHOD OF PREPARING SAME AND RECHARGEABLE LITHIUM BATTERY INCLUDING SAME

(75) Inventors: Kyeu-Yoon Sheem, Yongin-si (KR); Young-Seak Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 13/593,901

(22) Filed: Aug. 24, 2012

(65) Prior Publication Data
US 2013/0164624 A1 Jun. 27, 2013

(30) Foreign Application Priority Data
Dec. 23, 2011 (KR) .......... 10-2011-0141311

(51) Int. Cl.
*H01M 4/583* (2010.01)
(52) U.S. Cl.
USPC .................. 429/231.8; 429/231.95
(58) Field of Classification Search
USPC ............ 429/231.95, 231.7, 231.8; 252/182.1; 427/78; 977/742, 948
See application file for complete search history.

(56) References Cited

U.S. PATENT DOCUMENTS

| | | | |
|---|---|---|---|
| 4,770,959 A * | 9/1988 | Koyama et al. ............... | 429/334 |
| 7,563,542 B2 | 7/2009 | Yazami et al. | |
| 7,645,538 B1 * | 1/2010 | Hallifax et al. ................. | 429/80 |
| 2007/0231696 A1 * | 10/2007 | Yazami et al. ............. | 429/231.7 |
| 2008/0038635 A1 * | 2/2008 | Sheem et al. ................. | 429/212 |
| 2009/0104532 A1 * | 4/2009 | Hosoya ......................... | 429/224 |
| 2012/0034516 A1 | 2/2012 | Koo et al. | |

FOREIGN PATENT DOCUMENTS

| | | |
|---|---|---|
| JP | 06-312216 | 11/1994 |
| JP | 2000-353523 | 12/2000 |
| JP | 2002-348742 | 12/2002 |
| KR | 10-2008-0073751 | 8/2008 |
| KR | 10-2010-0052419 | 5/2010 |

OTHER PUBLICATIONS

English Machine Translation of JP 06-312216, 9 pages.
English Machine Translation of JP 2000-353523, 9 pages.
English Machine Translation of JP 2002-348742, 7 pages.
K. Edström, T. Gustafsson, J.O. Thomas; The Cathode-Electrolyte Interface in the Li-ion Battery, Science Direct Electrochimica Acta 50 (2004) 397-403, 7 pages.
M. Ishihara, M. Suzuki, T. Watanabe, T. Nakamura, A. Tanaka and Y. Koga; Synthesis and Characterization of Fluorinated Amorphous Carbon Films by Reactive Magnetron Sputtering, Science Direct Diamond and Related Materials 14 (2005) 989-993, 5 pages.

(Continued)

*Primary Examiner* — Mark F Huff
*Assistant Examiner* — Monique Wills
(74) *Attorney, Agent, or Firm* — Christie, Parker & Hale, LLP

(57) ABSTRACT

Disclosed are a positive active material that includes a core particle including a lithium-containing compound configured to reversibly intercalate and deintercalate lithium, and a coating layer on a surface of the core particle, the coating layer including a material including a carbon-fluorine (C—F) bond, a method of manufacturing the same, and a rechargeable lithium battery including the positive active material.

20 Claims, 3 Drawing Sheets

(56) References Cited

OTHER PUBLICATIONS

Doron Aurbach, Boris Markovsky, Gregory Salitra, Elena Markevich, Yossi Talyossef, Maxim Koltypin, Linda Nazar, Brian Ellis and Daniella Kovacheva, Review on Electrode-Electrolyte Solution Interactions, Related to Cathode Materials for Li-ion Batteries, Science Direct Journal of Power Sources 165 (2007) 491-499, 9 pages.

A. Ait Salah, P. Jozwiak, K. Zaghib, J. Garbarczyk, F. Gendron, A. Mauger and C.M. Julien, FTIR Features of Lithium-Iron Phosphates as Electrode Materials for Rechargeable Lithium Batteries, ScienceDirect Spectrochimica Acta Part A 65 (2006) 1007-1013, 7 pages.

F. Simmen, A. Hintennach, M. Horisberger, T. Lippert, P. Novák, C. W. Schneider, and A. Wokaun, Aspects of the Surface Layer Formation on $Li_{1+x}Mn_2O_{4-\delta}$ during Electrochemical Cycling, Journal of the Electrochemical Society, 157 (9) A1026-A1029 (2010), 4 pages.

Byong Chol Bai, Seok Chang Kang, Ji Sun Im, Se Hyun Lee and Young-Seak Lee, Effect of Oxyfluorinated Multi-Walled Carbon Nanotube Additives on Positive Temperature Coefficient/Negative Temperature Coefficient Behavior in High-Density Polyethylene Polymeric Switches, Materials Research Bulletin 46 (2011) 1391-1397, 7 pages.

Jatindranath Maiti, Nitul Kakati, Seok Hee Lee and Young Soo Yoon, Fluorination of Multiwall Carbon Nanotubes by a Mild Fluorinating Reagent $HPF_6$, Journal of Fluorine Chemistry xxx (2011) xxx-xxx, 5 pages.

\* cited by examiner

POSITIVE ACTIVE MATERIAL AND METHOD OF PREPARING SAME AND RECHARGEABLE LITHIUM BATTERY INCLUDING SAME

RELATED APPLICATIONS

This application claims priority to and the benefit of Korean Patent Application No. 10-2011-0141311 filed in the Korean Intellectual Property Office on Dec. 23, 2011, the entire contents of which are incorporated herein by reference.

BACKGROUND

1. Field

A positive active material and a method of preparing the same, and a rechargeable lithium battery including the positive active material are disclosed.

2. Description of the Related Art

Batteries transform chemical energy generated from an electrochemical redox reaction of a chemical material in the battery into electrical energy. Such batteries are divided into a primary battery, which should be disposed of after the energy of the battery is all consumed, and a rechargeable battery, which can be recharged many times. The rechargeable battery can be charged/discharged many times based on the reversible transformation between chemical energy and electrical energy.

Recent developments in high-tech electronics have allowed electronic devices to become small and light in weight, which leads to an increase in portable electronic devices. As a power source for such portable electronic devices, the demands for batteries with high energy density are increasing and research on rechargeable lithium battery is briskly under progress.

The rechargeable lithium battery is fabricated by injecting electrolyte into a battery cell, which includes a positive electrode including a positive active material capable of intercalating/deintercalating lithium ions and a negative electrode including a negative active material capable of intercalating/deintercalating lithium ions.

Meanwhile, when the rechargeable lithium battery is charged and discharged, a passivation film called a solid electrolyte interface (SEI) may be excessively formed on the surface of the electrode through a reduction reaction of an electrolyte solution. The excessively formed passivation film hinders transfer of lithium ions and thus the performance of the rechargeable lithium battery may be deteriorated by the excessively formed passivation film.

SUMMARY

One embodiment provides a positive active material configured to suppress performance deterioration of a rechargeable lithium battery.

Another embodiment provides a method of manufacturing the positive active material.

Yet another embodiment provides a rechargeable lithium battery including the positive active material.

According to one embodiment, provided is a positive active material including a core particle including a lithium-containing compound configured to reversibly intercalate and deintercalate lithium; and a coating material including a carbon-fluorine (C—F) bond on a surface of the core particle.

The coating material may include a fluorine-bonded carbon nanostructure, a fluorine-bonded graphene, a fluorine-bonded carbon black, a fluorine-bonded graphite, a fluorine-bonded acetylene black, a fluorine-bonded carbon fine powder, a fluorinated organic material, or a combination thereof.

The fluorine-bonded carbon nanostructure may include a fluorine-bonded carbon nanotube, a fluorine-bonded carbon nano fiber, a fluorine-bonded carbon nano ribbon, a fluorine-bonded carbon nano bead, or a combination thereof.

The coating material may include a fluorine-bonded carbon nanostructure including the C—F bond, and the C—F bond of the fluorine-bonded carbon nanostructure may exhibit a peak in a range of about 950 $cm^{-1}$ to about 1350 $cm^{-1}$ as measured by FT-IR spectroscopy.

The core particle may further include carbon; and the C—F bond of the coating material may be formed from at least a portion of the carbon of the core particle, and may exhibit a peak in a range of about 1150 $cm^{-1}$ to about 1160 $cm^{-1}$ measured by FT-IR spectroscopy.

The core particle may further include carbon, and the coating material may further include LiF.

The LiF may exhibit a (111) peak at a 2θ value of about 39°, a (200) peak at a 2θ value of about 45° and a (220) peak at a 2θ value of about 63° as measured by X-ray diffraction (XRD) analysis.

According to one embodiment, provided is a method of manufacturing a positive active material, the method including preparing a lithium-containing compound configured to reversibly intercalate and deintercalate lithium, and forming a coating layer on a surface of the lithium-containing compound, the coating layer including a coating material including a carbon-fluorine (C—F) bond.

The forming the coating layer may include fluorinating the surface of a carbon particle to form a fluorinated carbon particle and coating the surface of the lithium-containing compound with the fluorinated carbon particle.

The carbon particle may include a carbon nanostructure, graphene, carbon black, graphite, acetylene black, a carbon fine powder, an organic material, or a combination thereof.

The fluorinating the surface of the carbon particle may include: supplying a fluorine-containing gas and an inert gas at a ratio in a range of about 5:95 to about 95:5 (v/v) at a temperature in a range of about 25° C. to about 500° C. to the carbon particle.

In another embodiment, the forming the coating layer may include: forming a carbon thin layer on the lithium-containing compound; and fluorinating the carbon thin layer.

The forming the carbon thin layer on the lithium-containing compound may include: preparing a mixture of the lithium-containing compound and a carbon precursor to form a mixture; and heat-treating the mixture.

The carbon precursor may be included in the mixture in an amount in a range of about 0.1 wt % to about 30 wt % based on the total amount of the mixture.

The fluorinating the carbon thin layer may include: supplying a fluorine-containing gas and an inert gas at a ratio in a range of about 5:95 to about 95:5 (v/v) to the carbon thin layer at a temperature in a range of about 25° C. to about 500° C.

In another embodiment, the forming the coating layer may include: directly fluorinating the surface of the lithium-containing compound.

According to yet another embodiment, provided is a rechargeable lithium battery that includes a positive electrode including the positive active material, a negative electrode, and an electrolyte.

The rechargeable lithium battery may further include: a LiF film formed on the surface of the positive electrode.

The LiF film may exhibit a binding energy peak in a range of about 685 eV to about 690 eV in an X-ray diffraction (XRD) analysis.

Since the excessive formation of a film on the surface of a positive electrode is prevented, battery performance may be improved.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
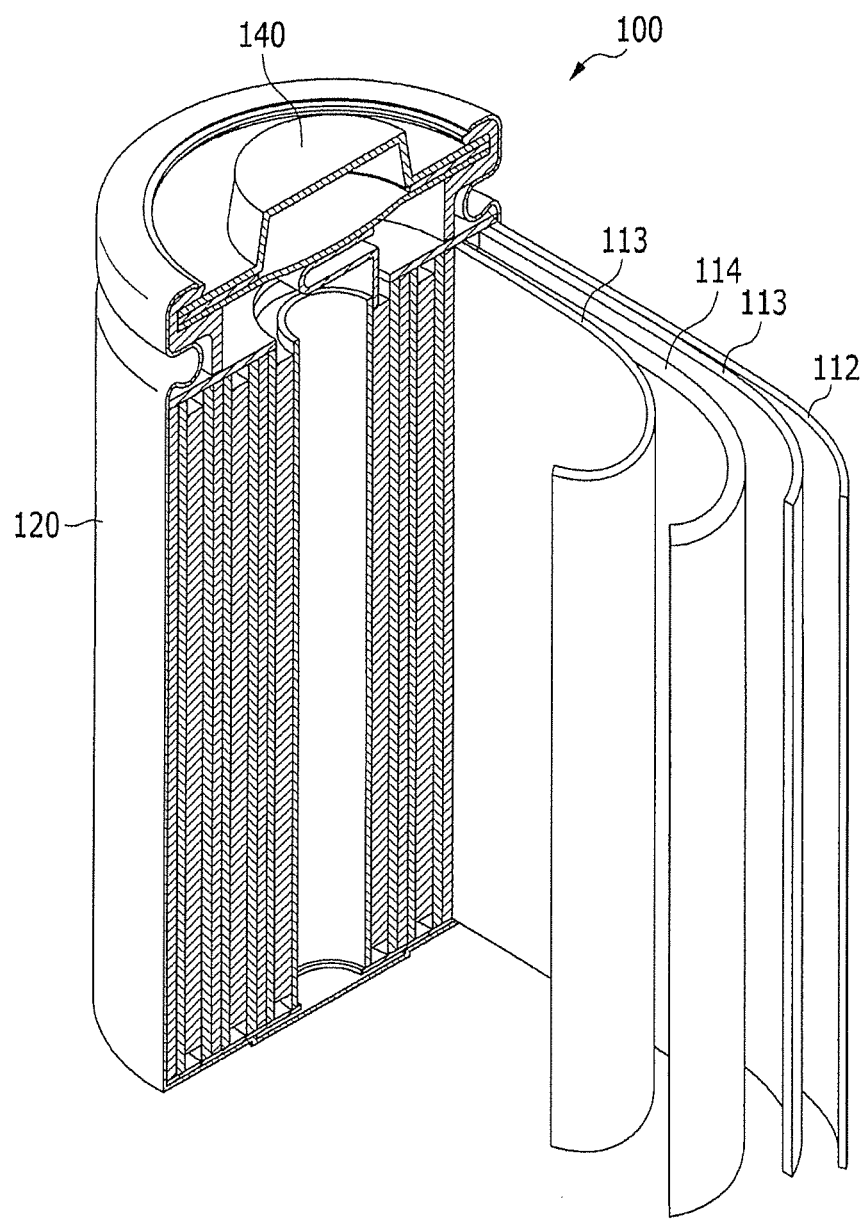
FIG. 1 is a schematic view showing a rechargeable lithium battery according to one embodiment.

In the following detailed description, only certain exemplary embodiments of the present invention are shown and described, by way of illustration. As those skilled in the art would recognize, the invention may be embodied in many different forms and should not be construed as being limited to the embodiments set forth herein. Also, in the context of the present application, when a first element is referred to as being "on" a second element, it can be directly on the second element or be indirectly on the second element with one or more intervening elements interposed therebetween. Like reference numerals designate like elements throughout the specification.

The positive active material according to one embodiment of the invention includes a core particle including a compound configured to reversibly intercalate and deintercalate lithium, and a coating material including a carbon-fluorine (C—F) bond on a surface of the core particle.

The compound may be a compound configured to reversibly intercalate and deintercalate lithium, for example a composite of lithium and a metal such as cobalt (Co), manganese (Mn), nickel (Ni), iron (Fe), or a combination thereof.

For example, the following compounds may be used:
Li$_a$A$_{1-b}$R$_b$D$_2$ (0.90≤a≤1.8 and 0≤b≤0.5); Li$_a$E$_{1-b}$R$_b$O$_{2-c}$D$_c$ (0.90≤a≤1.8, 0≤b≤0.5 and 0≤c≤0.05); LiE$_{2-b}$R$_b$O$_{4-c}$D$_c$ (0≤b≤0.5, 0≤c≤0.05); Li$_a$Ni$_{1-b-c}$Co$_b$R$_c$D$_\alpha$ (0.90≤a≤1.8, 0≤b≤0.5, 0≤c≤0.05 and 0<α≤2); Li$_a$Ni$_{1-b-c}$Co$_b$R$_c$O$_{2-\alpha}$Z$_\alpha$ (0.90≤a≤1.8, 0≤b≤0.5, 0≤c≤0.05 and 0<α<2); Li$_a$Ni$_{1-b-c}$Co$_b$R$_c$O$_{2-\alpha}$Z$_2$ (0.90≤a≤1.8, 0≤b≤0.5, 0≤c≤0.05 and 0<α<2); Li$_a$Ni$_{1-b-c}$Mn$_b$R$_c$D$_\alpha$ (0.90≤a≤1.8, 0≤b≤0.5, 0≤c≤0.05 and 0<α≤2); Li$_a$Ni$_{1-b-c}$Mn$_b$R$_c$O$_{2-\alpha}$Z$_\alpha$ (0.90≤a≤1.8, 0≤b≤0.5, 0≤c≤0.05 and 0<α<2); Li$_a$Ni$_{1-b-c}$Mn$_b$R$_c$O$_{2-\alpha}$Z$_2$ (0.90≤a≤1.8, 0≤b≤0.5, 0≤c≤0.05 and 0α2); Li$_a$Ni$_b$E$_c$G$_d$O$_2$ (0.90≤a≤1.8, 0≤b≤0.9, 0≤c≤0.5 and 0.001≤d≤0.1); Li$_a$Ni$_b$Co$_c$Mn$_d$G$_e$O$_2$ (0.90≤a≤1.8, 0≤b≤0.9, 0≤c≤0.5, 0≤d≤0.5, and 0.001≤e≤0.1); Li$_a$NiG$_b$O$_2$ (0.90≤a≤1.8 and 0.001≤b≤0.1); Li$_a$CoG$_b$O$_2$ (0.90≤a≤1.8 and 0.001≤b≤0.1); Li$_a$MnG$_b$O$_2$ (0.90≤a≤1.8 and 0.001≤b≤0.1); Li$_a$Mn$_2$G$_b$O$_4$ (0.90≤a≤1.8 and 0.001≤b≤0.1); QO$_2$; QS$_2$; LiQS$_2$; V$_2$O$_5$; LiV$_2$O$_5$; LiTO$_2$; LiNiVO$_4$; Li$_{(3-f)}$J$_2$(PO$_4$)$_3$ (0≤f≤2); Li$_{(3-f)}$Fe$_2$(PO$_4$)$_3$ (0≤f≤2); and LiFePO$_4$.

In the above chemical formulae, A is Ni, Co, Mn, or a combination thereof; R is Al, Ni, Co, Mn, Cr, Fe, Mg, Sr, V, a rare earth element, or a combination thereof; D is O, F, S, P, or a combination thereof; E is Co, Mn, or a combination thereof; Z is F, S, P, or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu, or a combination thereof.

In one embodiment of the invention, a coating layer includes the carbon-fluorine (C—F) bond of the coating material on its surface, and the carbon of the carbon-fluorine bond is derived from a carbon nanostructure, graphene, carbon black, graphite, acetylene black, a carbon fine powder, an organic material, or a combination thereof.

For example, the coating material may include a fluorine-bonded carbon nanostructure, fluorine-bonded graphene, fluorine-bonded carbon black, fluorine-bonded graphite, fluorine-bonded acetylene black, a fluorine-bonded carbon fine powder, a fluorinated organic material, or a combination thereof. Herein, the fluorine-bonded carbon nanostructure may include a fluorine-bonded carbon nanotube, a fluorine-bonded carbon nano fiber, a fluorine-bonded carbon nano ribbon, a fluorine-bonded carbon nano bead, or a combination thereof.

In one embodiment, the core particle also includes carbon. In this embodiment, the coating material including the carbon-fluorine (C—F) bond may be formed by directly fluorinating at least a portion of the carbon of the core particle.

According to embodiments of the invention, the presence of a carbon-fluorine bond of the coating material may be confirmed by Fourier Transform infrared spectroscopy (FT-IR).

For example, when the coating material includes a fluorine-bonded carbon nanostructure, the carbon-fluorine (C—F) bond of the fluorine-bonded carbon nanostructure exhibits a peak in a range of about 950 cm$^{-1}$ to about 1350 cm$^{-1}$ as measured by FT-IR spectroscopy.

For example, in certain embodiments, when the core particle includes carbon, the carbon-fluorine (C—F) bond exhibits a peak in a range of about 1150 cm$^{-1}$ to about 1160 cm$^{-1}$ as measured by FT-IR spectroscopy.

In certain embodiments, the core particle includes carbon, and the coating layer further includes LiF.

For example, the LiF may be uniformly distributed on the surface of the lithium-containing compound. When the positive active material of an embodiment of the invention is included in a rechargeable lithium battery, the LiF on the surface of the lithium-containing compound prevents or reduces the excessive and/or non-uniform formation of a passivation film on the surface of a positive electrode.

The LiF is formed as a result of lithium (Li) in the lithium-containing compound reacting with fluorine (F) when the lithium-containing compound is fluorinated. The formation of LiF may be confirmed by X-ray diffraction (X-ray diffraction, XRD). For example, the LiF may exhibit a (111) peak at a 2θ value of about 39°, a (200) peak at a 2θ value of about 45° and a (220) peak at a 2θ value of about 63°, as measured by X-ray diffraction (XRD). The XRD analysis may be performed by using CuK α ray.

The coating layer may have a thickness in a range of about 1 nm to about 1000 nm. When the coating layer has a thickness in the foregoing range, lithium ions may easily be transmitted to the core particle, thereby decreasing resistance that would otherwise be caused by the coating layer, while still providing suitable conductivity. According to one embodiment, the coating layer may have a thickness in a range of about 1 nm to about 600 nm. According to another embodiment, the coating layer may have a thickness in a range of about 1 nm to about 300 nm.

The above-described positive active material may be included in a positive electrode of a rechargeable lithium battery. When the positive active material of an embodiment of the invention is included in the positive electrode, LiF may be formed from the fluorine of the carbon-fluorine (C—F) bond of the positive active material, and lithium, during one cycle of charge and discharge of the rechargeable lithium battery.

For example, the reaction scheme for the formation of LiF is as follows.

[Reaction Scheme]

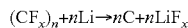

$(CF_x)_n + nLi \rightarrow nC + nLiF_x$

The LiF may exist as a LiF film on the surface of the positive electrode after one cycle of charge and discharge of the rechargeable lithium battery, and the LiF film may prevent or reduce the excessive formation of a passivation film on the surface of the positive electrode during the subsequent cycles of charge and discharge of the rechargeable lithium battery, which prevents or reduces lithium loss. Therefore, deterioration of the performance of the rechargeable lithium battery of embodiments of the invention is prevented or reduced.

Meanwhile, the carbon (C) produced in the foregoing reaction scheme may improve electric charge transfer characteristics on the surface of the positive electrode.

Hereafter, a method for manufacturing the above-described positive active material is described.

The method of manufacturing the positive active material includes preparing a lithium-containing compound configured to reversibly intercalate and deintercalate lithium, and forming a coating layer including a material including a carbon-fluorine (C—F) bond on the surface of the lithium-containing compound.

The coating layer may be formed through any suitable method, including a variety of diverse methods.

For example, the coating layer may be formed by fluorinating the surface of a carbon particle and coating the surface of the lithium-containing compound with the fluorinated carbon particle. The carbon particle may be a carbon nanostructure, graphene, carbon black, graphite, acetylene black, a carbon fine powder, an organic material or a combination thereof.

In the process of fluorinating the surface of the carbon particle, a mixed gas of a fluorine-containing gas and an inert gas may be supplied to the carbon particle. The fluorine-containing gas may be $F_2$, $CHF_3$, $CH_2F_2$, $CF_4$ or a combination thereof, and the inert gas may be nitrogen gas ($N_2$), argon gas (Ar), helium (He), or a combination thereof.

According to one embodiment, the mixed gas may include the fluorine-containing gas and the inert gas at a ratio in a range of about 5:95 to about 95:5 (v/v). According to another embodiment, the mixed gas may include the fluorine-containing gas and the inert gas at a ratio in a range of about 10:90 to about 20:80 (v/v).

According to one embodiment, the pressure of the mixed gas may be in a range of about 0.01 to about 2 atm. According to another embodiment, it may be in a range of about 0.01 to about 0.5 atm.

The fluorinating process may be performed at a temperature in a range of about 25° C. to about 500° C. for a time in a range of about 1 minute to about 2 hours.

As another example, the coating layer may be formed by forming a carbon passivation film (e.g., a carbon thin layer) on the lithium-containing compound and fluorinating the carbon passivation film (e.g., the carbon thin layer).

The carbon passivation film (e.g., the carbon thin layer) may be formed by mixing the lithium-containing compound and a carbon precursor and performing a heat treatment (e.g., heat treating). The carbon precursor may include citric acid, dihydroxy naphthalene, or a combination thereof, and the heat treatment may be performed at a temperature in a range of about 500° C. to about 1500° C. for a time in a range of about 60 minutes to about 500 minutes. Through the heat treatment, the carbon precursor may be transformed into a carbon thin layer to cover the surface of the lithium-containing compound.

The process of fluorinating the carbon thin layer may be performed by supplying a mixed gas of a fluorine-containing gas, e.g., $CHF_3$, $CH_2F_2$ and $CF_4$, and an inert gas, e.g., nitrogen gas, argon gas and helium gas, just as in the previously described method.

According to one embodiment, the mixed gas may include the fluorine-containing gas and the inert gas at a ratio in a range of about 5:95 to about 95:5 (v/v). According to another embodiment, the mixed gas may include the fluorine-containing gas and the inert gas at a ratio in a range of about 10:90 to about 20:80 (v/v). According to one embodiment, the pressure of the mixed gas may be in a range of about 0.01 to about 2 atm. According to another embodiment, the pressure of the mixed gas may be in a range of about 0.01 to about 0.5 atm.

The fluorinating process may be performed at a temperature in a range of about 25° C. to about 500° C. for a time in a range of about 1 minute to about 2 hours.

Through the fluorination, the carbon-fluorine (C—F) bond may be formed at the carbon passivation film (e.g., the carbon thin layer) covering the surface of the lithium-containing compound.

As another example, the coating layer may be formed by directly fluorinating a lithium-containing compound containing carbon. Examples of the lithium-containing compound containing carbon include $LiFePO_4$.

Hereafter, a rechargeable lithium battery according to one embodiment is described.

The rechargeable lithium battery according to one embodiment includes a positive electrode including a positive active material, a negative electrode, and an electrolyte.

FIG. 1 is a schematic view showing a rechargeable lithium battery according to one embodiment.

Referring to FIG. 1, the rechargeable lithium battery 100 includes a battery cell including a positive electrode 114, a negative electrode 112 facing the positive electrode 114, a separator 113 interposed between the positive electrode 114 and the negative electrode 112, an electrolyte solution (not shown) impregnating the positive electrode 114, negative electrode 112, and separator 113, a battery case 120, and a sealing member 140 sealing the battery case 120.

The positive electrode 114 includes a current collector and a positive active material layer formed on at least one side of the current collector.

The current collector may include aluminum foil, but it is not limited thereto.

The positive active material layer includes the positive active material, a binder, and a conductive material.

The binder improves binding properties of positive active material particles with one another and with the current collector. Examples of the binder include polyvinylalcohol, carboxylmethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidenefluoride, polyethylene, polypropylene, a styrene-butadiene rubber, an acrylated styrene-butadiene rubber, an epoxy resin, nylon, and the like, but are not limited thereto.

The conductive material is included to improve electrode conductivity. Any suitable electrically conductive material may be used as a conductive material unless it causes a chemical change. Examples of the conductive material include a carbon-based material such as natural graphite, artificial graphite, carbon black, acetylene black, ketjen black, carbon fiber, and the like; a metal-based material, a metal powder or a metal fiber of copper, nickel, aluminum, silver, and the like; a conductive polymer material such as a polyphenylene derivative; or a mixture thereof.

The positive electrode 114 may be fabricated by mixing the positive active material, the binder and the conductive material in a solvent to prepare a positive active material slurry, and applying the positive active material slurry on a current collector. The solvent may be N-methylpyrrolidone but it is not limited thereto. Since the method of fabricating a positive electrode is well known, it is not described in detail in the present specification.

As described above, the LiF film (not shown) may be formed on the surface of the positive electrode 114. According to one embodiment, the LiF film may exhibit a binding energy peak in a range of about 685 eV to about 690 eV as measured by X-ray diffraction (XRD). According to another embodiment, the LiF film may exhibit a binding energy peak in a range of about 686 eV to about 688 eV as measured by XRD. The XRD analysis may be performed by using CuK $\alpha$ ray.

The negative electrode 112 includes a current collector and a negative active material layer formed on at least one side of the current collector.

The current collector may include a copper foil, a nickel foil, a stainless steel foil, a titanium foil, a nickel foam, a copper foam, a polymer substrate coated with a conductive metal, or a combination thereof.

The negative active material layer includes a material that reversibly intercalates/deintercalates lithium ions, a lithium metal, a lithium metal alloy, a material configured to dope and dedope lithium, or a transition metal oxide.

In certain embodiments, the material that reversibly intercalates/deintercalates lithium ions includes a carbon material. The carbon material may be any generally-used carbon-based negative active material in a rechargeable lithium ion battery. Examples of the carbon material include crystalline carbon, amorphous carbon, and mixtures thereof. The crystalline carbon may be non-shaped, or sheet, flake, spherical, or fiber shaped natural graphite or artificial graphite. The amorphous carbon may be a soft carbon, a hard carbon, a mesophase pitch carbonization product, fired coke, and the like.

Among the foregoing, embodiments including graphite do not show any voltage variation on the part of the negative electrode. Therefore, a negative electrode including graphite may be used to fabricate a 3V-class high-capacity battery along with the lithium vanadium oxide-based positive active material.

Examples of the lithium metal alloy include lithium and a metal selected from the group consisting of Na, K, Rb, Cs, Fr, Be, Mg, Ca, Sr, Si, Sb, Pb, In, Zn, Ba, Ra, Ge, Al, and Sn.

The material configured to dope and dedope lithium includes Si, $SiO_x$ ($0<x<2$), a Si-Q alloy (wherein Q is an element selected from the group consisting of an alkali metal, an alkaline-earth metal, a group 13 element, a group 14 element, a group 15 element, a group 16 element, a transition element, a rare earth element, and a combination thereof, with the proviso that Q is not Si), Sn, $SnO_2$, a Sn—R alloy (wherein R is an element selected from the group consisting of an alkali metal, an alkaline-earth metal, a group 13 element, a group 14 element, a transition element, a rare earth element, and a combination thereof, with the proviso that R is not Sn), or mixtures thereof. At least one of these materials may be mixed with $SiO_2$. The elements Q and R may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

The transition metal oxide may include vanadium oxide, lithium titanium oxide, lithium vanadium oxide.

The binder improves binding properties of the negative active material particles to each other and to a current collector. The binder may include a non-water-soluble binder, a water-soluble binder, or a combination thereof.

The non-water-soluble binder may include polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may include a styrene-butadiene rubber, an acrylated styrene-butadiene rubber, polyvinyl alcohol, sodium polyacrylate, a copolymer of propylene and a C2 to C8 olefin, a copolymer of (meth)acrylic acid and (meth)acrylic acid alkyl ester, or a combination thereof.

When the water-soluble binder is used as a negative electrode binder, a cellulose-based compound may further be used to provide viscosity. The cellulose-based compound may include one or more of carboxylmethyl cellulose, hydroxypropylmethyl cellulose, methyl cellulose, or alkali metal salts thereof. The alkali metal may be Na, K, or Li. The cellulose-based compound may be included in an amount of about 0.1 to about 3 parts by weight based on 100 parts by weight of the negative active material as a thickener.

Any suitable conductive material may be used as a conductive material unless it causes a chemical change. Examples of the conductive material include a carbon-based material such as natural graphite, artificial graphite, carbon black, acetylene black, ketjen black, carbon fiber, and the like; a metal-based material such as a metal powder or a metal fiber of copper, nickel, aluminum, silver, and the like; a conductive polymer such as polyphenylene derivative; or mixtures thereof.

The negative electrode may be fabricated by mixing a negative active material, a binder and, optionally, a conductive material in a solvent to prepare a negative active material slurry, and coating the negative active material slurry on a current collector followed by drying and compressing. The solvent may be N-methylpyrrolidone but it is not limited thereto. Since the method of fabricating the negative electrode is well known, it is not described in detail in the present specification.

The electrolyte may include a non-aqueous organic solvent and a lithium salt.

The non-aqueous organic solvent is configured to transmit ions taking part in the electrochemical reaction of a battery.

The non-aqueous organic solvent may include a carbonate-based, ester-based, ether-based, ketone-based, alcohol-based, or aprotic solvent. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like, and the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and the like. The ether-based solvent may include dibutyl ether, tetraglyme, diglyme, dimethoxyethane, 2-methyltetrahydrofuran, tetrahydrofuran and the like, and the ketone-based solvent may include cyclohexanone, and the like. The alcohol-based solvent may include ethanol, isopropylalcohol, and the like. The aprotic solvent may include nitriles such as R—CN (wherein R is a C2 to C20 linear, branched, or cyclic hydrocarbon group, which may include a double bond, an aromatic ring, or an ether bond), amides such as dimethylformamide, dimethylacetamide, dioxolanes such as 1,3-dioxolane, sulfolanes, and the like.

The non-aqueous organic solvent may be used singularly or in a mixture. When the organic solvent is used in a mixture, its mixture ratio can be controlled in accordance with desirable performance of the battery.

The carbonate-based solvent may include a mixture of a cyclic carbonate and a linear carbonate. The cyclic carbonate and the linear carbonate may be mixed together in a volume ratio in a range of about 1:1 to about 1:9, which may enhance performance of the electrolyte.

In addition, the non-aqueous organic solvent may be prepared by further adding the aromatic hydrocarbon-based solvent to the carbonate-based solvent. The carbonate-based solvent and the aromatic hydrocarbon-based solvent may be mixed together in a volume ratio in a range of about 1:1 to about 30:1.

The aromatic hydrocarbon-based organic solvent may be an aromatic hydrocarbon-based compound represented by the following Chemical Formula 1.

[Chemical Formula 1]

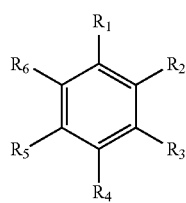

In Chemical Formula 1, $R_1$ to $R_6$ are independently selected from the group consisting of hydrogen, a halogen, a C1 to C10 alkyl group, a haloalkyl group, and a combination thereof.

The aromatic hydrocarbon-based organic solvent may be selected from the group consisting of benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The non-aqueous electrolyte may further include vinylene carbonate or an ethylene carbonate-based compound represented by the following Chemical Formula 2 in order to improve cycle-life of the battery.

[Chemical Formula 2]

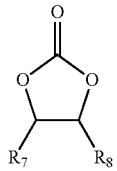

In Chemical Formula 2, $R_7$ and $R_8$ are the same or different and are selected from the group consisting of hydrogen, a halogen, a cyano group (CN), a nitro group ($NO_2$), and a C1 to C5 fluoroalkyl group, provided that at least one of $R_7$ and $R_8$ is a halogen, a cyano group (CN), a nitro group ($NO_2$) or a C1 to C5 fluoroalkyl group, and $R_7$ and $R_8$ are not simultaneously hydrogen.

The ethylene carbonate-based compound may include difluoroethylenecarbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the vinylene carbonate or the ethylene carbonate-based compound for improving cycle life may be adjusted within an appropriate or suitable range.

The lithium salt is dissolved in the organic solvent and supplies lithium ions in the rechargeable lithium battery, allowing operation of the rechargeable lithium battery and improving lithium ion transfer between the positive and negative electrodes. Such a lithium salt may include at least one supporting salt selected from $LiPF_6$, $LiBF_4$, $LiSbF_6$, $LiAsF_6$, $LiN(SO_2C_2F_6)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein, x and y are natural numbers), LiCl, LiI, and $LiB(C_2O_4)_2$ (lithium bis(oxalato) borate, LiBOB).

The lithium salt may be included at a concentration in a range of about 0.1 to about 2.0 M. When the lithium salt is included within the above concentration range, it may improve electrolyte performance and lithium ion mobility due to optimal electrolyte conductivity and viscosity.

The separator 113 separates the positive electrode 114 from the negative electrode 112 and provides a path for lithium ions and may include any suitable material commonly used as a separator for a lithium ion battery. In other words, the separator has low resistance against ion transfer to or from the electrolyte and excellent moisturizing capability in the electrolyte. For example, the separator may be selected from a glass fiber, polyester, TEFLON (tetrafluoroethylene), polyethylene, polypropylene, polytetrafluoroethylene (PTFE), or a combination thereof, and may be non-woven fabric or fabric. For example, a polyolefin-based polymer separator such as polyethylene, and the like may be used as the separator for a lithium ion battery, and a separator coated with a ceramic component or a polymer material may be used to secure heat resistance or mechanical strength. The separator may have, selectively, a single layer or multi-layers.

The rechargeable lithium battery may be classified as a lithium ion battery, a lithium ion polymer battery, or a lithium polymer battery according to the presence of a separator and the kind of electrolyte used therein. The rechargeable lithium battery may have a variety of shapes and sizes and thus, may include a cylindrical, prismatic, coin, or pouch-type battery and a thin film type or a bulky type in size. The structure and fabricating method for a lithium ion battery pertaining to the present invention are well known in the art.

The following examples illustrate the present invention in more detail. These examples, however, should not in any sense be interpreted as limiting the scope of the present invention.

Preparation of Positive Active Material

Preparation Example 1

A fluorinated carbon nanotube (F-CNT) was acquired by putting 2 g of carbon nanotube into a fluorination reactor, supplying a fluorine gas ($F_2$) and a nitrogen gas ($N_2$) at a ratio of 10:90 (v/v), and inducing a reaction at 150° C. for 10 minutes.

Subsequently, 1 g of the F-CNT was dispersed into 200 g of N-methylpyrrolidone (NMP), and then 98 g of $LiCoO_2$ was added thereto to form a dispersion solution. Subsequently, the dispersion solution was reacted in a spray dryer which was set to a temperature of 95° C. to obtain $LiCoO_2$ coated with F-CNT.

Preparation Example 2

$LiCoO_2$ coated with citric acid was obtained by adding 95 wt % $LiCoO_2$ to ethanol including 5 wt % citric acid dissolved therein, and mixing and drying the mixture. Subsequently, $LiCoO_2$ coated with a carbon thin layer was obtained by putting the $LiCoO_2$ coated with the citric acid into a reactor and performing a heat treatment having a final temperature of 700° C. while supplying a nitrogen gas. The carbon thin layer was formed as the citric acid was thermally decomposed. Subsequently, $LiCoO_2$ coated with a fluorinated carbon thin layer was obtained by putting 20 g of $LiCoO_2$ coated with the carbon thin layer into a fluorination reactor, supplying a fluorine gas ($F_2$) and a nitrogen gas ($N_2$) at a ratio of 5:95 (v/v), and inducing a reaction at a temperature of 100° C. for 5 minutes.

Preparation Example 3

$LiFePO_4$ coated with a fluorinated carbon thin layer was obtained by putting 10 g of $LiFePO_4$ powder containing 0.2 wt % of carbon into a fluorination reactor, supplying a fluorine gas ($F_2$) and a nitrogen gas ($N_2$) at a ratio of 50:50 (v/v), and inducing a reaction at a temperature of 150° C. for 10 minutes.

Preparation Example 4

$LiFePO_4$ coated with a fluorinated carbon thin layer was obtained by putting 10 g of $LiFePO_4$ powder containing 0.2% of carbon into a fluorination reactor, supplying a fluorine gas ($F_2$) and a nitrogen gas ($N_2$) at a ratio of 20:80 (v/v), and inducing a reaction at a temperature of 150° C. for 10 minutes.

Preparation Example 5

$LiFePO_4$ coated with a fluorinated carbon thin layer was obtained by putting 10 g of $LiFePO_4$ powder containing 0.2% of carbon into a fluorination reactor, supplying a fluorine gas ($F_2$) and a nitrogen gas ($N_2$) at a ratio of 10:90 (v/v), and inducing a reaction at a temperature of 150° C. for 10 minutes.

Comparative Preparation Example 1

$LiCoO_2$ powder that was not coated with F-CNT or a fluorinated carbon thin layer was prepared.

Comparative Preparation Example 2

$LiFePO_4$ powder that was not coated with F-CNT or a fluorinated carbon thin layer was prepared.

Comparative Preparation Example 3

20 g of $LiCoO_2$ was put into a fluorination reactor, and a fluorine gas ($F_2$) and a nitrogen gas ($N_2$) were supplied at a ratio of 10:90 (v/v), and then fluorination was performed at 200° C. at atmospheric pressure for 1 hour.

Analysis of Positive Active Material—1

X-ray diffraction analysis (XRD) and Fourier Transform infrared spectroscopy (FT-IR) were performed on the $LiCoO_2$ coated with F-CNT according to Preparation Example 1.

In the X-ray diffraction analysis (XRD), C—F binding energy peaks appear at 289.3 eV and about 290.5 eV. It may be seen from the result that the F-CNT coating layer includes a material including a C—F bond.

Analysis of Positive Active Material—2

X-ray diffraction analysis (XRD) and Fourier Transform infrared spectroscopy (FT-IR) were performed on the $LiFePO_4$ coated with the fluorinated carbon thin layers according to Preparation Examples 3 to 5 and the $LiFePO_4$ according to Comparative Preparation Example 2. The XRD analysis was performed by using CuK α ray.

The results are described with reference to FIGS. 2 and 3.

Figure 2:
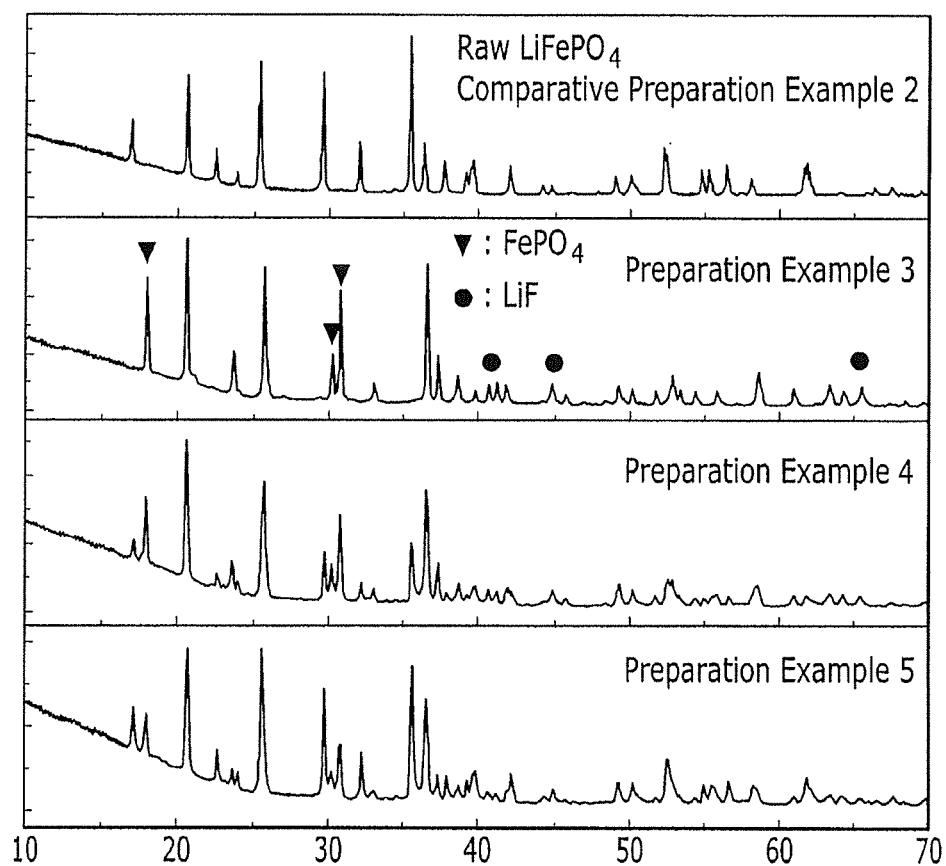
FIG. 2 is an X-ray diffraction (XRD) graph of LiFePO$_4$ coated with the fluorinated carbon thin layers according to Preparation Examples 3 to 5 and LiFePO$_4$ according to Comparative Preparation Example 2.

FIG. 2 is an X-ray diffraction (XRD) graph of $LiFePO_4$ coated with the fluorinated carbon thin layers according to Preparation Examples 3 to 5 and $LiFePO_4$ according to Comparative Preparation Example 2. FIG. 3 is a Fourier transform infrared spectroscopy (FT-IR) graph of $LiFePO_4$ coated with the fluorinated carbon thin layers according to Preparation Examples 3 to 5 and $LiFePO_4$ according to Comparative Preparation Example 2.

It may be seen from FIG. 2 that the $LiFePO_4$ coated with the fluorinated carbon thin layer according to Preparation Example 3 includes $FePO_4$ (orthorhombic structure) (▼) and LiF (●). In short, a (200) peak representing the $LiFePO_4$ does not appear at a 2θ value of 17°. Instead, a (020) peak at a 2θ value of 18°, a (121) peak at a 2θ value of 30°, and a (200) peak at a 2θ value of 31°, which indicate the presence of $FePO_4$ are observed, and a (111) peak at a 2θ value of 39°, a (200) peak at a 2θ value of 45°, and a (220) peak at a 2θ value 63°, which indicate the presence of LiF are observed.

Also, similarly to Preparation Example 3, the $LiFePO_4$ coated with the fluorinated carbon thin layers according to Preparation Examples 4 and 5 exhibited peaks that indicated the presence of both $FePO_4$ and LiF simultaneously and the structure of the $LiFePO_4$ was observed together.

Also, when the $LiFePO_4$ coated with the fluorinated carbon thin layers according to Preparation Examples 3 to 5 were compared, the $LiFePO_4$ coated with the fluorinated carbon thin layer according to Preparation Example 3, which was exposed to the greatest amount of fluorine gas of the Preparation Examples, exhibited a stronger peak than the $LiFePO_4$ coated with the fluorinated carbon thin layers according to Preparation Example 4 or 5.

On the other hand, it might be seen that the LiFePO$_4$ according to Comparative Preparation Example 2 showed a LiFePO$_4$ single phase structure.

Figure 3:
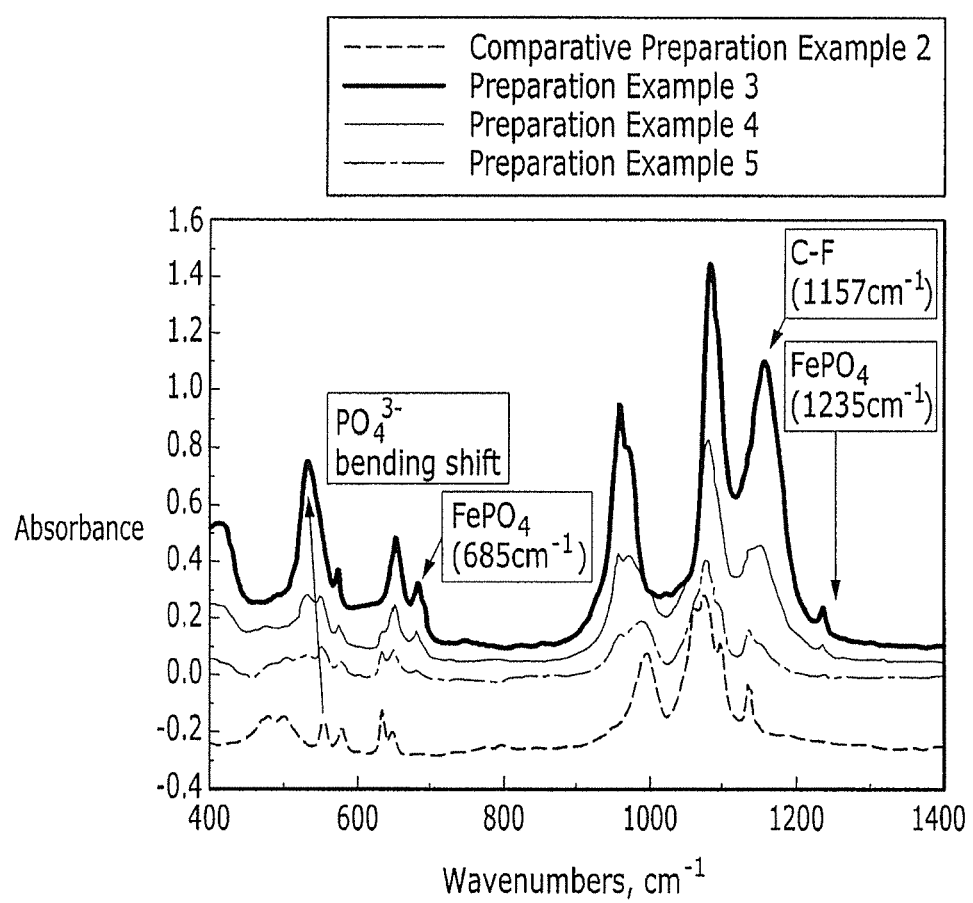
FIG. 3 is a Fourier transform infrared spectroscopy (FT-IR) graph of LiFePO$_4$ coated with the fluorinated carbon thin layers according to Preparation Examples 3 to 5 and LiFePO$_4$ according to Comparative Preparation Example 2.

Referring to FIG. 3, the LiFePO$_4$ coated with the fluorinated carbon thin layers according to Preparation Examples 3 to 5 each exhibit a peak in their respective FT-IR spectra corresponding to the carbon-fluorine (C—F) bond at around 1157 cm$^{-1}$, and they each exhibit a peak in their respective FT-IR spectra corresponding to FePO$_4$ at around 1235 cm$^{-1}$. The peaks of around 1157 cm$^{-1}$ and 1235 cm$^{-1}$ did not appear in the Comparative Preparation Example 2.

Also, when the LiFePO$_4$ coated with the fluorinated carbon thin layers according to Preparation Examples 3 to 5 were compared, the LiFePO$_4$ coated with the fluorinated carbon thin layer according to Preparation Example 3, which was exposed to the greatest amount of fluorine gas of the Preparation Examples, exhibited a stronger peak than the LiFePO$_4$ coated with the fluorinated carbon thin layer according to Preparation Example 4 or 5.

Fabrication of Electrode

Example 1

A positive active material slurry was prepared by mixing 97.5 wt % of the positive active material according to Preparation Example 1, 1.5 wt % of a carbon black conductive material and 1 wt % of a PVDF binder. Subsequently, a positive electrode was manufactured by coating an aluminum foil with the positive active material slurry and then drying it.

A coin-type half-cell was manufactured by using metallic lithium as a counter electrode and the positive electrode and using an electrolyte prepared by dissolving 1M LiPF$_6$ in a mixed solution prepared by mixing ethylene carbonate (EC), dimethyl carbonate (DMC) and diethyl carbonate (DEC) at a ratio of 3:4:3 (v/v/v) as an electrolyte.

Example 2

A coin-type half-cell was manufactured according to the same method as Example 1, except that the positive active material according to Preparation Example 2 was used instead of the positive active material according to Preparation Example 1.

Example 3

A coin-type half-cell was manufactured according to the same method as Example 1, except that the positive active material slurry was prepared by mixing 80 wt % of the positive active material according to Preparation Example 3, 10 wt % of carbon black conductive material and 10 wt % of a polyvinylidene fluoride binder.

Example 4

A coin-type half-cell was manufactured according to the same method as Example 1, except that the positive active material slurry was prepared by mixing 80 wt % of the positive active material according to Preparation Example 4, 10 wt % of carbon black conductive material and 10 wt % of a polyvinylidene fluoride binder.

Example 5

A coin-type half-cell was manufactured according to the same method as Example 1, except that the positive active material slurry was prepared by mixing 80 wt % of the positive active material according to Preparation Example 5, 10 wt % of carbon black conductive material and 10 wt % of polyvinylidene fluoride binder.

Comparative Example 1

A coin-type half-cell was manufactured according to the same method as Example 1, except that the positive active material slurry was prepared by mixing 98 wt % of LiCoO$_2$, 1 wt % of carbon black conductive material and 1 wt % of a polyvinylidene fluoride binder.

Comparative Example 2

A coin-type half-cell was manufactured according to the same method as Example 1, except that the positive active material slurry was prepared by mixing 80 wt % of LiFePO$_4$, 10 wt % of carbon black conductive material and 10 wt % of a polyvinylidene fluoride binder.

Comparative Example 3

A coin-type half-cell was manufactured according to the same method as Example 1, except that the positive active material slurry was prepared by mixing 85 wt % of the positive active material according to Comparative Preparation Example 3, 10 wt % of acetylene black conductive material, and 5 wt % of a polyvinylidene fluoride binder.

Evaluation—1

The half-cells according to Examples 1 to 5 and Comparative Examples 1 to 3 were charged and discharged at 1 C and 5 C.

The initial specific capacity, specific capacity (%) as a ratio of the capacity at 5 C and 1 C, and the specific capacity retention (%) after performing charge and discharge 100 times of the half-cells according to Examples 1 to 5 and Comparative Examples 1 to 3 were measured.

The measurement results are shown in the following Table 1.

TABLE 1

| | Initial specific capacity (0.2 C, mAh/g) | Capacity (5 C/1 C, %) | 100$^{th}$ cycle capacity retention (5 C/1 C, %) |
|---|---|---|---|
| Example 1 | 154 | 85 | 74 |
| Example 2 | 152 | 86 | 76 |
| Example 3 | 149 | 91 | 75 |
| Example 4 | 151 | 89 | 76 |
| Example 5 | 150 | 91 | 77 |
| Comparative Example 1 | 155 | 83 | 47 |
| Comparative Example 2 | 148 | 90 | 53 |
| Comparative Example 3 | 149 | 82 | 64 |

It may be seen from Table 1 that the half-cells according to Examples 1 to 5 and the half-cells according to Comparative Examples 1 and 2 did not have significant differences in their respective initial specific capacities, but the capacity retentions of the half-cells according to Comparative Examples 1 and 2 dropped remarkably at the 100$^{th}$ charge and discharge, compared with the capacity retention of the half-cells according to Examples 1 to 5.

It may be understood that whereas a LiF thin film that was already formed on the surface of the positive electrode in Examples 1 to 5 prevented or reduced excessive and irregular formation of an additional passivation film during the charge and discharge, and thus the sheet resistance was not increased greatly in case of the half-cells according to Examples 1 to 5. In contrast, it is believed that the additional passivation film was excessively formed on the surface of the positive electrode in Comparative Examples 1 and 2, which increased the sheet resistance and deteriorated the electron transfer characteristics while the charge and discharge were performed 100 times, thus degrading cycle-life.

Also, compared with the half-cells according to Examples 1 to 5, the half-cell according to Comparative Example 3 showed similar results in terms of capacity retention, that is, cycle-life characteristics. However, since the initial resistance was very high due to the presence of fluorine (F) on the surface of the positive active material surface, the specific capacity was reduced in Comparative Example 3.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A positive active material, comprising:
   a core particle comprising a lithium-containing compound configured to reversibly intercalate and deintercalate lithium; and
   a coating material comprising a fluorine-bonded carbon nanostructure comprising a fluorine-bonded carbon nanotube comprising a carbon-fluorine (C—F) bond, wherein the coating material is directly on a surface of the lithium-containing compound of the core particle.

2. The positive active material of claim 1, wherein the coating material further comprises a fluorine-bonded graphene, a fluorine-bonded carbon black, a fluorine-bonded graphite, a fluorine-bonded acetylene black, a fluorine-bonded carbon fine powder, a fluorinated organic material, or a combination thereof.

3. The positive active material of claim 1, wherein the fluorine-bonded carbon nanostructure comprises the C—F bond, and the C—F bond of the fluorine-bonded carbon nanostructure exhibits a peak in a range of about 950 $cm^{-1}$ to about 1350 $cm^{-1}$ as measured by FT-IR spectroscopy.

4. The positive active material of claim 1, wherein:
   the core particle further comprises carbon; and
   the C—F bond of the coating material is formed from at least a portion of the carbon of the core particle, and exhibits a peak in a range of about 1150 $cm^{-1}$ to about 1160 $cm^{-1}$ as measured by FT-IR spectroscopy.

5. The positive active material of claim 1, wherein the core particle further comprises carbon, and the coating material further comprises LiF.

6. The positive active material of claim 5, wherein the LiF exhibits a (111) peak at a 2θ value of about 39°, a (200) peak at a 2θ value of about 45°, and a (220) peak at a 2θ value of about 63° as measured by X-ray diffraction (XRD) analysis.

7. A method of manufacturing a positive active material, the method comprising:
   preparing a lithium-containing compound configured to reversibly intercalate and deintercalate lithium; and
   forming a coating layer directly on a surface of the lithium-containing compound, the coating layer comprising a coating material comprising a fluorine-bonded carbon nanostructure comprising a fluorine-bonded carbon nanotube comprising a carbon-fluorine (C—F) bond.

8. The method of claim 7, wherein the forming the coating layer comprises:
   fluorinating the surface of a carbon particle to form a fluorinated carbon particle; and
   coating the surface of the lithium-containing compound with the fluorinated carbon particle.

9. The method of claim 8, wherein the carbon particle comprises a carbon nanostructure comprising a carbon nanotube.

10. The method of claim 8, wherein the fluorinating the surface of the carbon particle comprises:
    supplying a fluorine-containing gas and an inert gas at a ratio in a range of about 5:95 to about 95:5 (v/v) at a temperature in a range of about 25° C. to about 500° C. to the carbon particle.

11. The method of claim 7, wherein the forming the coating layer comprises:
    forming a carbon thin layer on the lithium-containing compound; and
    fluorinating the carbon thin layer.

12. The method of claim 11, wherein the forming the carbon thin layer on the lithium-containing compound comprises:
    preparing a mixture of the lithium-containing compound and a carbon precursor to form a mixture; and
    heat-treating the mixture.

13. The method of claim 12, wherein the carbon precursor is included in the mixture in an amount in a range of about 0.1 wt % to about 30 wt % based on the total amount of the mixture.

14. The method of claim 11, wherein the fluorinating the carbon thin layer comprises:
    supplying a fluorine-containing gas and an inert gas at a ratio in a range of about 5:95 to about 95:5 (v/v) to the carbon thin layer at a temperature in a range of about 25° C. to about 500° C.

15. The method of claim 7, wherein the forming the coating layer comprises directly fluorinating the surface of the lithium-containing compound.

16. A rechargeable lithium battery, comprising:
    a positive electrode comprising the positive active material according to claim 1;
    a negative electrode; and
    an electrolyte.

17. The rechargeable lithium battery of claim 16, further comprising:
    a LiF film formed on the surface of the positive electrode.

18. The rechargeable lithium battery of claim 17, wherein the LiF film exhibits a binding energy peak in a range of about 685 eV to about 690 eV in an X-ray diffraction (XRD) analysis.

19. The positive active material of claim 1, wherein the coating material further comprises a fluorine-bonded carbon nano fiber, a fluorine-bonded carbon nano ribbon, a fluorine-bonded carbon nano bead, or a combination thereof.

20. The method of claim 9, wherein the carbon particle further comprises graphene, carbon black, graphite, acetylene black, a carbon fine powder, an organic material, or a combination thereof.

* * * * *